US007388583B2

(12) United States Patent
Redert (10) Patent No.: US 7,388,583 B2
(45) Date of Patent: Jun. 17, 2008

(54) METHOD OF AND SCALING UNIT FOR SCALING A THREE-DIMENSIONAL MODEL

(75) Inventor: Peter-André Redert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 155 days.

(21) Appl. No.: 10/563,929

(22) PCT Filed: Jul. 5, 2004

(86) PCT No.: PCT/IB2004/051124

§ 371 (c)(1),
(2), (4) Date: Jan. 9, 2006

(87) PCT Pub. No.: WO2005/006181

PCT Pub. Date: Jan. 20, 2005

(65) Prior Publication Data

US 2006/0197783 A1 Sep. 7, 2006

(30) Foreign Application Priority Data

Jul. 11, 2003 (EP) .................................. 03102126

(51) Int. Cl.
*G06T 15/00* (2006.01)
(52) U.S. Cl. ...................... 345/422; 345/426; 345/660; 348/51
(58) Field of Classification Search ................ 345/664, 345/660, 419–422, 426; 348/51
See application file for complete search history.

(56) References Cited

U.S. PATENT DOCUMENTS

| 6,313,866 | B1 | 11/2001 | Akamatsu et al. | ............ 348/51 |
| 6,466,185 | B2 * | 10/2002 | Sullivan et al. | ................ 345/6 |
| 6,690,373 | B2 * | 2/2004 | Lim | ........................... 345/426 |
| 7,113,183 | B1 * | 9/2006 | Collins et al. | .............. 345/419 |
| 7,167,188 | B2 * | 1/2007 | Redert | ........................ 345/660 |

OTHER PUBLICATIONS

P. W. Verbeek, et al: Low-Level Image Processing by Max-Min Filters, vol. 15, No. 3, 1988, 249-258.

* cited by examiner

*Primary Examiner*—Phu K. Nguyen (57) ABSTRACT

A method of scaling a three-dimensional input model (200-208) into a scaled three-dimensional output model (210-224) is disclosed. The method comprises determining for portions of the three-dimensional input model respective probabilities that the corresponding portions of the scaled three-dimensional output model are visible in a two-dimensional view of the scaled three-dimensional output model and geometrically transforming portions of the three-dimensional input model into the respective portions of the scaled three-dimensional output model on basis of the respective probabilities. The determining of probability of visibility is based on a projection of the three-dimensional input model in a viewing direction. By taking into account that some portions are not visible, no depth-range is wasted.

10 Claims, 8 Drawing Sheets

METHOD OF AND SCALING UNIT FOR SCALING A THREE-DIMENSIONAL MODEL

The invention relates to a method of scaling a three-dimensional input model into a scaled three-dimensional output model.

The invention further relates to a scaling unit for scaling a three-dimensional input model into a scaled three-dimensional output model.

The invention further relates to an image display apparatus comprising:
- receiving means for receiving a signal representing a three-dimensional input model;
- a scaling unit for scaling the three-dimensional input model into a scaled three-dimensional output model; and
- display means for visualizing a view of the scaled three-dimensional output model.

The probability that the size of a three-dimensional scene does not match with the display capabilities of an image display apparatus is high. Hence, a scaling operation is required. Other reasons why scaling might be required is to adapt the geometry of the three-dimensional model representing the three-dimensional scene to a transmission channel or to adapt the three-dimensional model to the viewer's preferences.

Linear scaling operations on a three-dimensional model representing a three-dimensional scene are well known. An embodiment of the image display apparatus of the kind described in the opening paragraph is known from the U.S. Pat. No. 6,313,866. This image display apparatus comprises a circuit for acquiring a depth information maximum value from a first image signal. The image display apparatus further comprises a parallax control circuit to control the amount of parallax of a second image signal on the basis of depth information contained in the first and second image signals such that an image corresponding to the second image signal can be three-dimensionally displayed in front of an image corresponding to the first image signal. A three-dimensional image synthesizer synthesizes the first and second image signals which have been controlled by the parallax control circuit, on the basis of the parallax amount of each image signal, such that images correspond to that first and second image signals in the three-dimensional display space. Scaling of depth information is in principle performed by means of a linear adaptation of the depth information except for depth information which exceeds the limits of the display capabilities. These latter values are clipped.

A disadvantage of depth adaptation or scaling is that it might result in reduction of depth impression. Especially the linear depth scaling might be disadvantageous for the depth impression of the scaled three-dimensional model.

It is an object of the invention to provide a method of the kind described in the opening paragraph which results in a scaled three-dimensional output model which resembles the three-dimensional input model perceptually and which has a pleasant three-dimensional impression.

This object of the invention is achieved in that the method comprises:
- determining for portions of the three-dimensional input model respective probabilities that the corresponding portions of the scaled three-dimensional output model are visible in a two-dimensional view of the scaled three-dimensional output model, the determining being based on a projection of the three-dimensional input model in a viewing direction; and
- geometrically transforming portions of the three-dimensional input model into the respective portions of the scaled three-dimensional output model, on basis of the respective probabilities.

As described above, scaling is required to match the three-dimensional input model with the e.g. the display capabilities of a display device. After the scaling of the three-dimensional input model into the scaled three-dimensional output model, multiple views will be created on basis of the scaled three-dimensional output model. The idea is that no depth-range, e.g. of the display device, should be wasted in the scaling for eventually invisible portions of the scaled three-dimensional output model. That means that those portions of the three-dimensional input model which corresponds to portions of the scaled three-dimensional output model which will not be visible in one of the views should be disregarded for the scaling. By making a particular view of the three-dimensional input model, by means of projecting the three-dimensional input model in a viewing direction, to be applied by the display device, it is possible to determine the visibility of the portions of the three-dimensional input model in that particular view. Based on that, it is possible to determine the probability of visibility of portions of the scaled three-dimensional output model. Portions of the scaled three-dimensional output model which correspond to portions of the three-dimensional input model which are visible in the particular view will in general also be visible in a view based on the scaled three-dimensional output model. Other portions of the scaled three-dimensional output model which correspond to other portions of the three-dimensional input model which are not visible in the particular view will have a relatively low probability of being visible in a view based on the scaled three-dimensional output model. By making multiple projections of the three-dimensional input model, each in a direction which corresponds with a viewing direction the probabilities of being visible can be adapted. However, even without really making these projections the probabilities of visibility can be determined on basis of other parameters, e.g. parameters related to the known capabilities of a display device. Alternatively, the probabilities are determined on basis of parameters of a transmission channel.

In an embodiment of the method according to the invention, determining the probability that a first one of the portions is visible, is based on comparing a first value of a first coordinate of the first one of the portions with a second value of the first coordinate of a second one of the portions. Determining whether portions of the three-dimensional input model occlude each other in the direction of the view can easily be done by means of comparing the values of the coordinates of the portions of the three-dimensional input. Preferably, the first coordinate corresponds to the viewing direction.

In an embodiment of the method according to the invention, determining the probability that the first one of the portions is visible, is based on capabilities of a display device on which the scaled three-dimensional output model will be displayed. The capabilities of the display device might correspond to a maximum viewing angle and the depth-range of the display device. These properties of the display device determine which views can be created, i.e. the maximum differences between the different views. On basis of these properties of the display device in combination with an appropriate view, i.e. projection of the three-dimensional input, the probability of visibility of portions in any of the possible views can easily be determined.

In an embodiment of the method according to the invention the geometrically transforming of the portions of the three-dimensional input model into the respective portions of the scaled three-dimensional output model, comprise one of translation, rotation or deformation. The topology of the portions is not changed because of these geometrical transformation.

It is a further object of the invention to provide a scaling unit of the kind described in the opening paragraph which provides a scaled three-dimensional output model which resembles the three-dimensional input model perceptually and which has a pleasant three-dimensional impression.

This object of the invention is achieved in that the scaling unit comprises:
probability determining means for determining for portions of the three-dimensional input model respective probabilities that the corresponding portions of the scaled three-dimensional output model are visible in a two-dimensional view of the scaled three-dimensional output model, the determining being based on a projection of the three-dimensional input model in a viewing direction; and
transformation means for geometrically transforming portions of the three-dimensional input model into the respective portions of the scaled three-dimensional output model on basis of the respective probabilities.

It is a further object of the invention to provide an image display apparatus of the kind described in the opening paragraph which provides a scaled three-dimensional output model which resembles the three-dimensional input model perceptually and which has a pleasant three-dimensional impression.

This object of the invention is achieved in that the scaling unit comprises:
probability determining means for determining for portions of the three-dimensional input model respective probabilities that the corresponding portions of the scaled three-dimensional output model are visible in a two-dimensional view of the scaled three-dimensional output model, the determining being based on a projection of the three-dimensional input model in a viewing direction; and
transformation means for geometrically transforming portions of the three-dimensional input model into the respective portions of the scaled three-dimensional output model on basis of the respective probabilities.

Modifications of the scaling unit and of the image display apparatus and variations thereof may correspond to modifications and variations thereof of the method described.

These and other aspects of the method, of the scaling unit and of the image display apparatus according to the invention will become apparent from and will be elucidated with respect to the implementations and embodiments described hereinafter and with reference to the accompanying drawings, wherein.

Same reference numerals are used to denote similar parts throughout the figures.

There are several types of models for the storage of three-dimensional information:
Wireframes, e.g. as specified for VRML. These models comprise a structure of lines and faces.
Volumetric data-structures or voxel maps (Voxel means volume element). These volumetric data-structures comprise a three-dimensional array of elements. Each element has three dimensions and represents a value of a property. E.g. CT (Computer tomography) data is stored as a volumetric data-structure in which each element corresponds to a respective Hounsfield value.
Two-dimensional image with depth map, e.g. a two-dimensional image with RGBZ values. This means that each pixel comprises a three color component values and a depth value. The three color component values also represent a luminance value.
Image based models, e.g. stereo image pairs or multiview images. These types of images are also called light fields.

Conversions of data represented by one type of three-dimensional model into another three-dimensional model is possible. E.g. data represented with a wireframe or a two-dimensional image with depth map can be converted by means of rendering into data represented with a volumetric data-structure or image based model.

Figure 1:
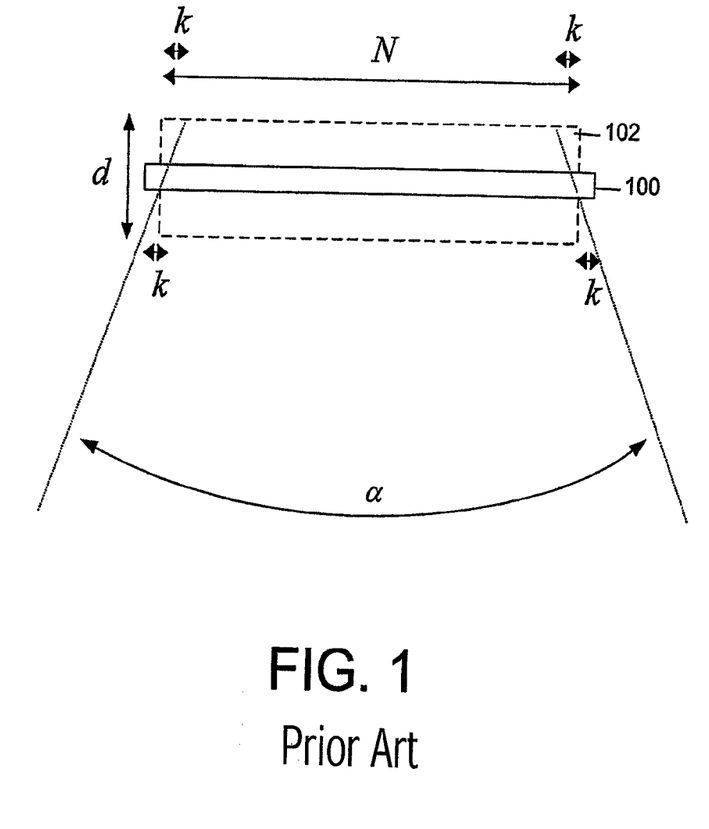
FIG. 1 schematically shows an autostereoscopic display device according to the prior art.

The amount of depth which can be realized with a three-dimensional image display device depends on its type. With a volumetric display device the amount of depth is fully determined by the dimensions of the display device. Stereo displays with e.g. glasses have a soft limit for the amount of depth which depends on the observer. Observers might become fatigued if the amount of depth is too much caused by a "conflict" between lens accommodation and mutual eye convergence. Autbstereoscopic display devices, e.g. based on an LCD with a lenticular screen for multiple views, have a theoretical maximum depth-range d which is determined by the amount of views. FIG. 1 schematically shows an autostereoscopic display device 100. Outside the physical display device 100, but within a virtual box 102, it can show objects within a certain depth-range, to viewers within a certain viewing angle a. These two together define a constant k in pixels, which is a percentage of the number N of pixels horizontally on the display device 100. This k equals the maximum disparity that the display device can show. The maximum depth-range can be exceeded, resulting in loss of sharpness.

Figure 2A:
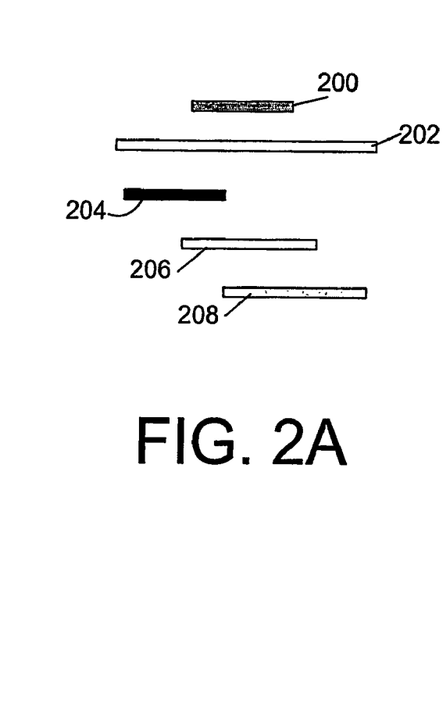
FIG. 2A schematically shows a top view of a three-dimensional input model.
Figure 2B:
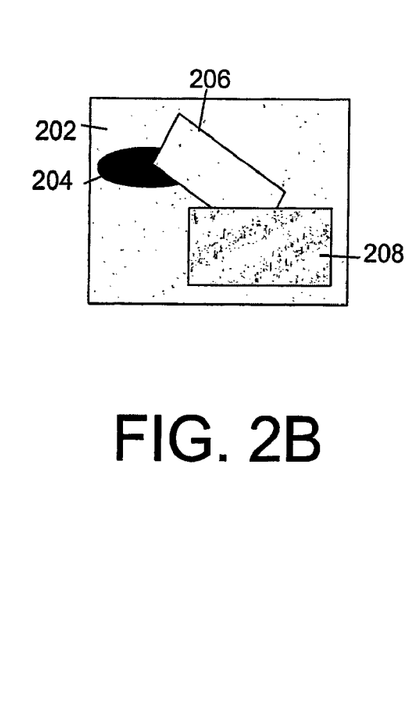
FIG. 2B schematically shows a frontal view of the three-dimensional input model of FIG. 2A.

FIG. 2A schematically shows a top view of a three-dimensional input model. The three-dimensional input model comprises a number of objects, 200-208 which differ in size and shape. FIG. 2B schematically shows a frontal view of the three-dimensional input model of FIG. 2A. It can be clearly seen that some of the objects occlude others objects, completely or partly. That means that some portions of the three-dimensional input model are not visible in the frontal view. E.g. one of the objects, namely object 200 is completely invisible in the frontal view.

Figure 2C:
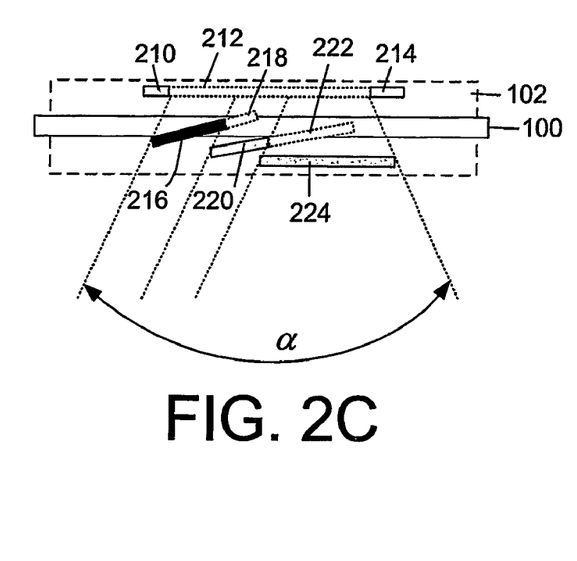
FIG. 2C schematically shows a top view of a scaled three-dimensional output model which is based on the three-dimensional input model of FIG. 2A.

FIG. 2C schematically shows a top view of a scaled three-dimensional output model which is based on the three-dimensional input model of FIG. 2A. A first one of the objects of the scaled three-dimensional input model which corresponds to a first one 200 of the objects of the three-dimensional input model is clipped to the border of the depth-range. A second one 224 of the objects of the scaled three-dimensional input model which corresponds to a second one 208 of the objects of the three-dimensional input model is located nearby the other border of the depth-range. A third one of the objects of the scaled three-dimensional input model which corresponds to a third one 202 of the objects of the three-dimensional input model comprises three portions 210-214 of which two are visible and a third one 212 is not visible in any of the possible views. A fourth one of the objects of the scaled three-dimensional input model which corresponds to a fourth one 204 of the objects of the three-dimensional input model comprises two portions 216,218 of which a first one 216 is visible and a second one 218 is not visible in any of the possible views. A fifth one of the objects of the scaled three-dimensional input model which corresponds to a fifth one 206 of the objects of the three-dimensional input model comprises two portions 220,222 of which a first one 210 is visible and a second one 222 is not visible in any of the possible views.

In connection with FIGS. 3A-3C it will be described how the probability of visibility can be determined for portions of a three-dimensional input model comprising a number of objects 1-8. This is based on the method according to the invention comprising the following steps:

computing the projection of the three-dimensional input model by means of a z-buffer stack;

indicating which of the z-buffer stack elements are visible in the projection by means of comparing z-values of pairs of z-buffer stack elements having mutually equal x-values and mutually equal y-values; and determining which groups of z-buffer stack elements form the respective portions of the three-dimensional input model, by means of segmentation of the z-buffer stack elements;

indicating the probability of visibility of each z-buffer stack element which is part of a group of z-buffer stack elements comprising a further z-buffer stack element which is visible, on basis of the capability of a display device. In this case a z-buffer stack element corresponds with a portion of the three-dimensional input model.

Figure 3A:
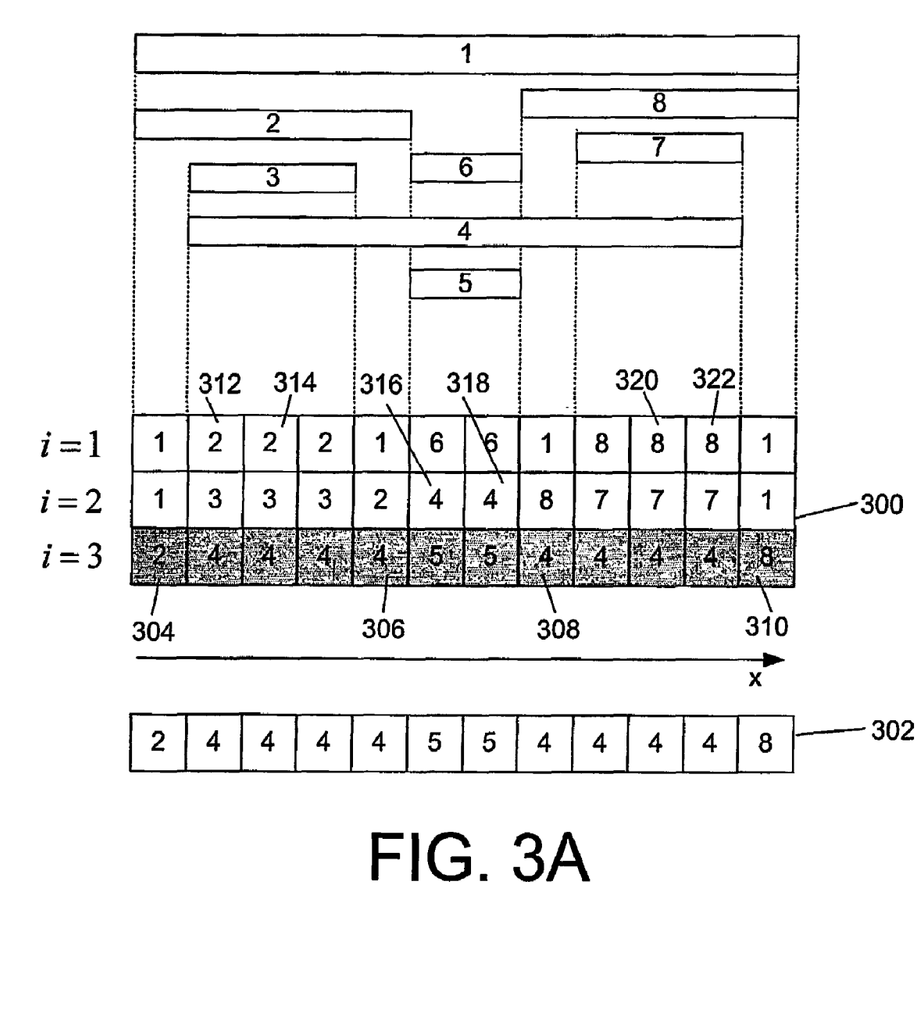
FIG. 3A schematically shows the contents of a z-buffer stack after the computation of a view on basis of a three-dimensional input model.

FIG. 3A schematically shows the contents of a z-buffer stack 300 after the computation of a view 302 on basis of the three-dimensional input model. The z-buffer stack 300 comprises a number of data-cells 304-322 for storage of data representing the portions of the three-dimensional input model.

This z-buffer stack 300 comprises three levels, i=1, i=2 and i=3.

The indicated numerals 1-8 in the data-cells 304-322 of the z-buffer stack 300 correspond to the different objects 1-8 of the three-dimensional input model. For example, in a first data-cell 312 data related to a portion of the second object 2 is stored. In the z-buffer stack 300 the z-values, i.e. depth values, of the portions of the three-dimensional input model are stored. Besides that, the corresponding color and luminance values are stored. In FIGS. 3A-3C only a number of data-cells 304-322 is depicted for a single value of the y-coordinate.

Creating a projection on basis of a z-buffer stack 300 is well-known in the prior art. Because of the nature of a z-buffer stack it is very easy to determine which of the z-buffer stack elements are visible in the view 302: those with the highest level, i.e. i=3 in this case. Thus, in the view 302 only those portions of which the data is stored in the data-cells, e.g. 304-310 of the highest level i=3 are present. In FIG. 3A the data-cells corresponding to the portions which are visible in this particular view are shaded. It can be seen that in this case only a portion of the second object 2 is visible and only a part of the eighth object 8 is visible. Most of the fourth object 4 is visible, except that part that is occluded by the fifth object 5.

Figure 3B:
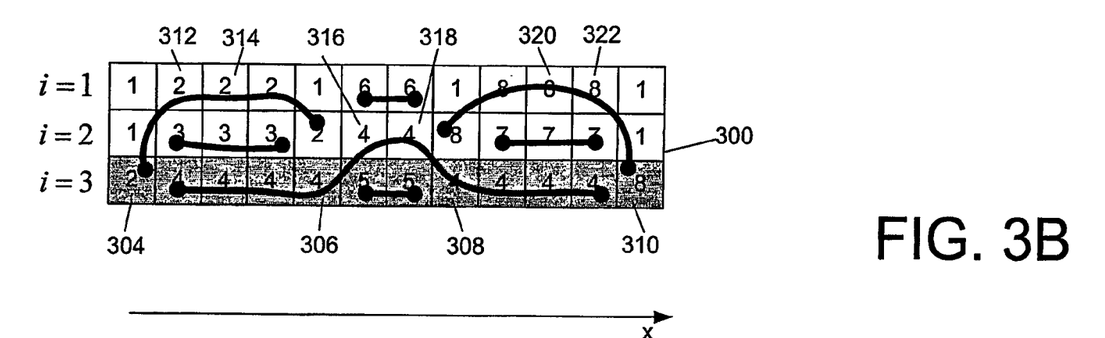
FIG. 3B schematically shows the contents of the z-buffer stack of FIG. 3A after segmentation.
Figure 3C:
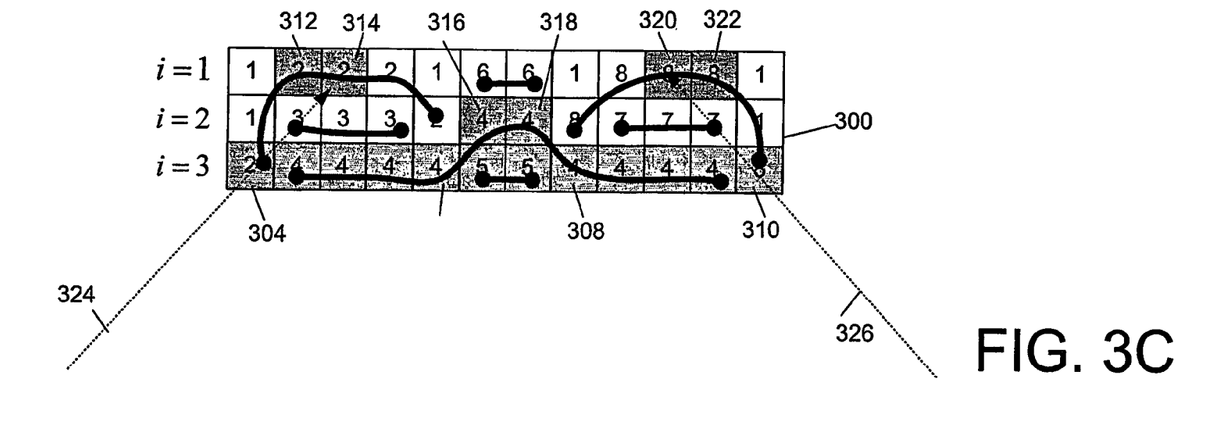
FIG. 3C schematically shows the contents of the z-buffer stack of FIG. 3B after updating the probabilities of visibility.

FIG. 3B schematically shows the contents of the z-buffer stack of FIG. 3A after segmentation. The segmentation is applied to determine which groups of the z-buffer stack elements form the respective objects 1-8 of the three-dimensional input model. For this purpose, the contents of the data-cells 304-322 of the z-buffer stack 300 are analyzed to determine which groups of the data-cells store the data belonging to the different objects of the three-dimensional input model. This segmentation, or object extraction is based on the stored values, e.g. color, luminance and depth in combination with the distance between the different data-cells 304-322 of the z-buffer stack 300. In FIG. 3B the different groups of data-cell are indicated by means of the curves with dots at the ends.

Besides, luminance, color and depth also the probability of visibility is stored in memory. Per data-cell a value of that quantity is stored. Typically the following types can be distinguished:

I: definitely will be visible in one of the projections;
II: most probably will be visible in one of the projections;
III: most probably will not be visible in one of the projections; and
IV: definitely will not be visible in one of the projections.

After the first projection, type I is assigned to a number of z-buffer stack elements, e.g. 304 and 306. Other z-buffer stack elements might get initialized with type IV or III.

After the segmentation, the probability of visibility of a number of the z-buffer stack elements is updated, on basis of the capability of the display device. Typically, the probability of visibility of each z-buffer stack element which is part of a group of z-buffer stack elements comprising a further z-buffer stack element which is visible (Type I), is adapted. For example, in a first data-cell 312 data related to a portion of the second object 2 is stored. After the segmentation it became clear that the first data-cell 312 belongs to a group of data-cells to which also a second data-cell 304 belongs of which it is known that it stores data belonging to a portion of object 2 which is visible. On basis of that and on basis of the known viewing angle and depth-range it is decided to update the probability of visibility of the second data-cell 312 to type II. In FIG. 3C with an arrow 324 it is indicated that this z-buffer stack element might be visible in another view. Also the probability of visibility of other data-cells 314-322 is updated in a similar way. FIG. 3C schematically shows the contents of a z-buffer stack of FIG. 3B after updating the probabilities of visibility. The z-buffer stack elements being assigned a probability of visibility of type I or II are shaded.

In the example described in connection with FIGS. 3A-3C all objects are opaque, i.e. not transparent. It should be noted that the method according to the invention also can be applied for transparent objects. In that case, also a value representing the transparency of each of the z-buffer stack elements, i.e. portions of the three-dimensional input models, should be stored in the respective data-cells 304-322.

Figure 4:
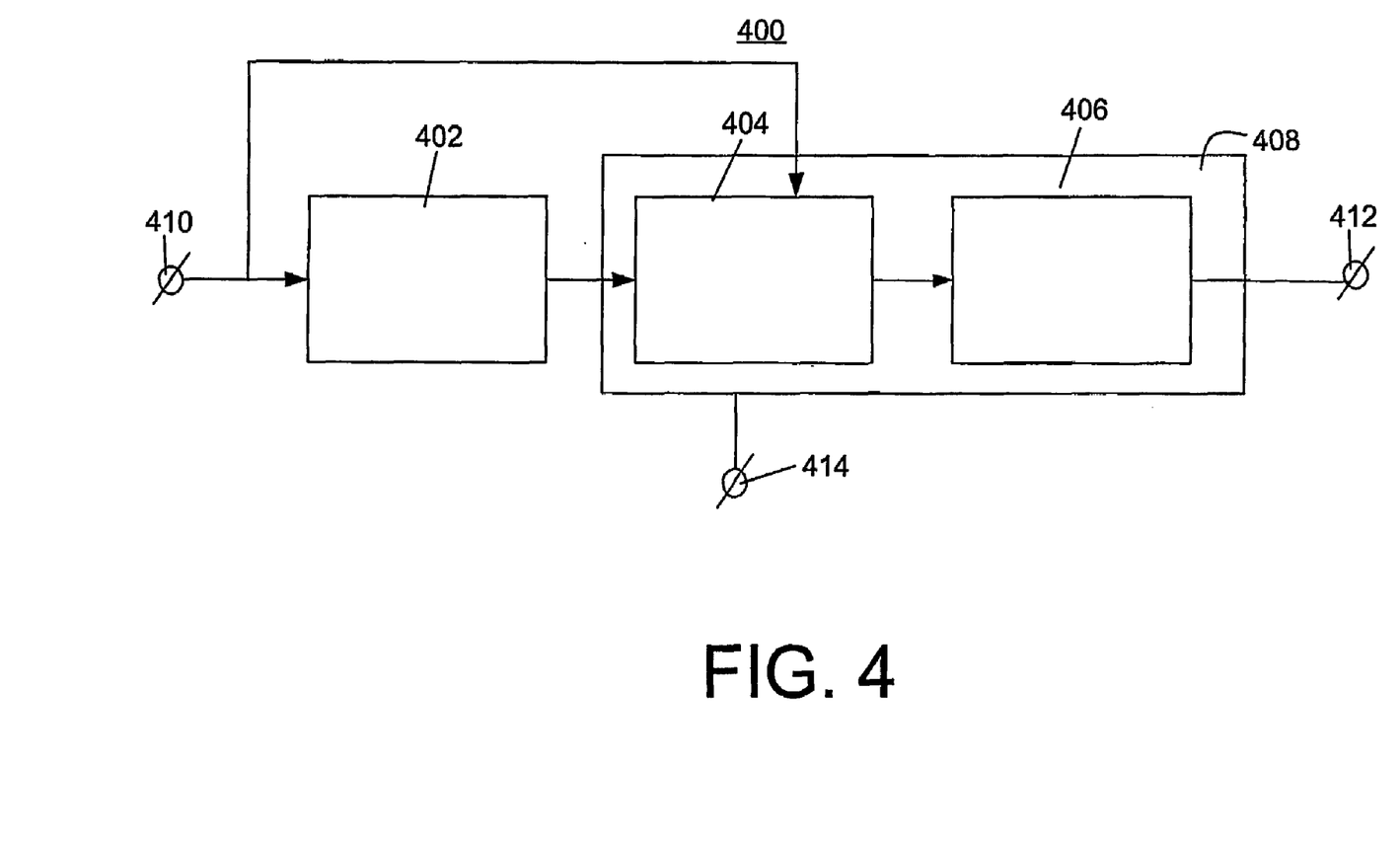
FIG. 4 schematically shows a scaling unit according to the invention.

FIG. 4 schematically shows a scaling unit 400 according to the invention for scaling a three-dimensional input model into a scaled three-dimensional output model. The scaling unit 400 comprises:

- a probability determining unit 402 for determining for portions of the three-dimensional input model respective probabilities that the corresponding portions of the scaled three-dimensional output model are visible in a two-dimensional view of the scaled three-dimensional output model; and
- a geometrical transformation unit 408 for geometrically transforming portions of the three-dimensional input model into the respective portions of the scaled three-dimensional output model on basis of the respective probabilities.

Data representing the three-dimensional input model is provided at the input connector 410 of the scaling unit 400 and the scaling unit 400 provides data representing the scaled three-dimensional output model at the output connector 412. Via the control interface 414 control data related to a display device, e.g. the depth-range and maximum viewing angle, are provided.

The working of the probability determining unit 402 is described in connection with FIGS. 3A-3C. The geometrical transformation unit 408 comprises a minimum and maximum detection unit 404 and a gain control unit 406. The minimum and maximum detection unit 404 is arranged to determine for each array of z-buffer stack elements having mutually equal x-values and mutually equal y-values a corresponding minimum z-value and maximum z-value. The gain control unit 406 is arranged to compute scaled z-values for the z-buffer stack elements on basis of the respective minimum z-values and maximum z-values and the depth-range of the display device. The working of the geometrical transformation unit 408 according to the invention will be described in more detail in connection with FIG. 4.

The probability determining unit 402, the minimum and maximum detection unit 404 and the gain control unit 406 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

Figure 5:
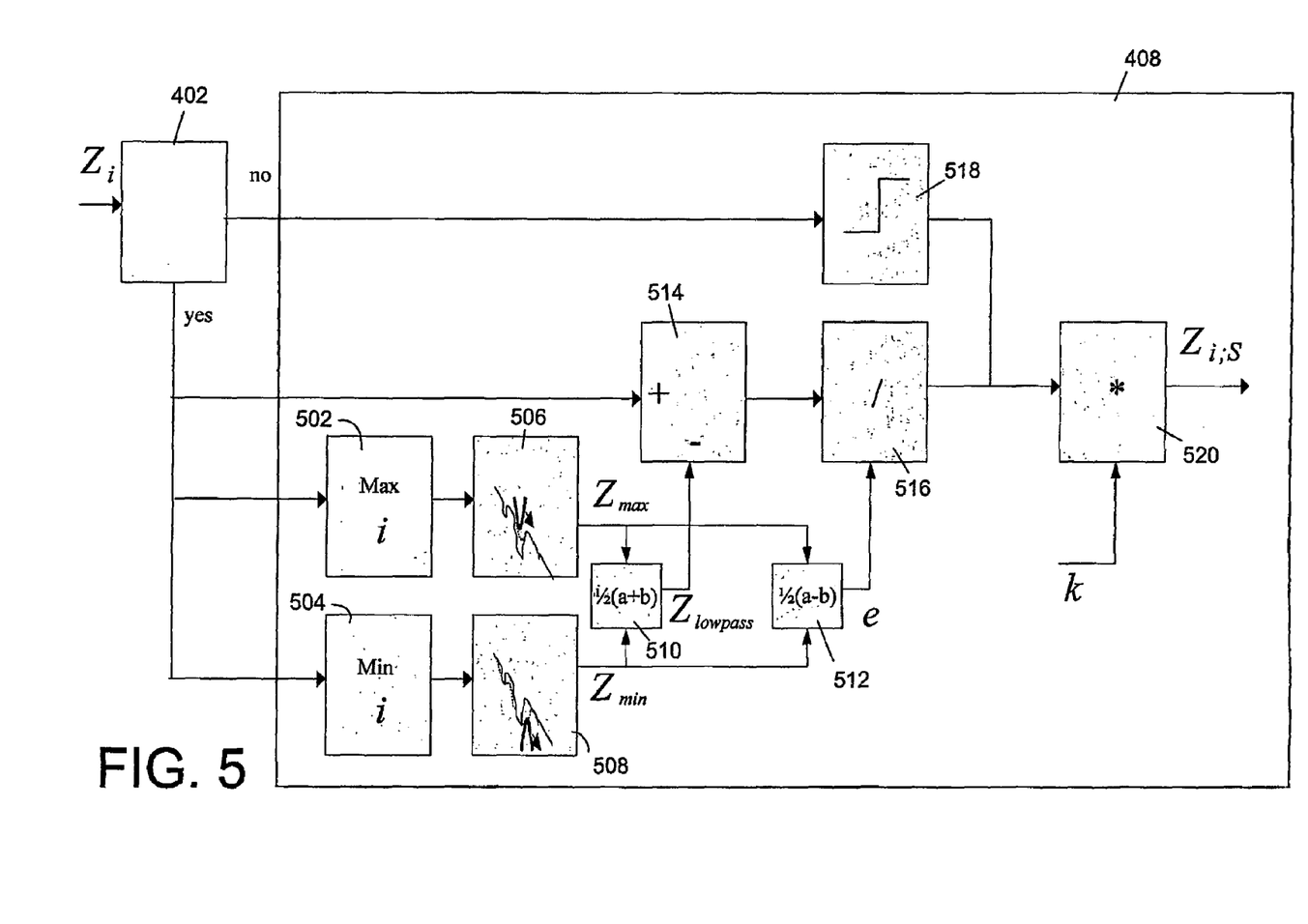
FIG. 5 schematically shows the geometrical transformation unit of the scaling unit according to the invention.

FIG. 5 schematically shows the geometrical transformation unit 408 of the scaling unit 400 according to the invention. This geometrical transformation unit 408 is designed to process the data in a z-buffer stack 300 as described in connection with FIG. 3C.

The data being stored in the z-buffer stack 300 is provided for each x,y pair. In the example described in connection with FIG. 3C there are three levels per array i=1, i=2 or i=3. For each of the levels a z-value is provided and a probability of visibility. If a particular z-buffer element is of type IV, i.e. definitely not visible in one of the in one of projections, then the corresponding data is provided to the clipping unit 518. Otherwise the data is provided to the maximum detector 502 and the minimum-detector 504. The maximum detector 502 is arranged to extract the maximum z-value per x,y coordinate and the minimum detector 504 is arranged to extract the minimum z-value per x,y coordinate. The maximum z-values for each x,y coordinate are provided to a first filter unit 506. The minimum z-values for each x,y coordinate are provided to a second filter unit 508. Preferably the first filter unit 506 and the second filter unit 508 are morphologic filters. Morphologic filters are common non-linear image processing units. See for instance the article "Low-level image processing by max-min filters" by P. W. Verbeek, H. A. Vrooman and L. J. van Vliet, in "Signal Processing", vol. 15, no. 3, pp. 249-258, 1988. Other types of filters, e.g. low-pass might also be applied for the first filter unit 506 and the second filter unit 508. The output of the first filter unit 506 is a kind of relief of maximum z-values and the output of the second filter unit 508 is a kind of relief of minimum z-values.

The output of the first filter unit 506 and the second filter unit 508 are combined by a first combining means 510 which adds the two signals and divides the sum by a factor two. The output of the first combining means 510 is a kind of mean value, i.e. a mean relief. This output is subtracted from the input data by means of the subtraction unit 514. This subtraction can be interpreted as a kind of offset correction.

The output of the first filter unit 506 and the second filter unit 508 are also combined by a second combining means 512 which subtracts the two signals and divides the sum by a factor two. The output of the second combining means 512 is a kind of range value which is used to normalize the output data of the subtraction unit 514. This normalization is performed by means of the normalisation unit 516. The output of the normalisation unit 516 is provided to the multiplier unit 520 which maps the data to the available depth-range or optionally preferred depth-range. In this case, k is a function of the available display depth range and viewing angle.

Figure 6:
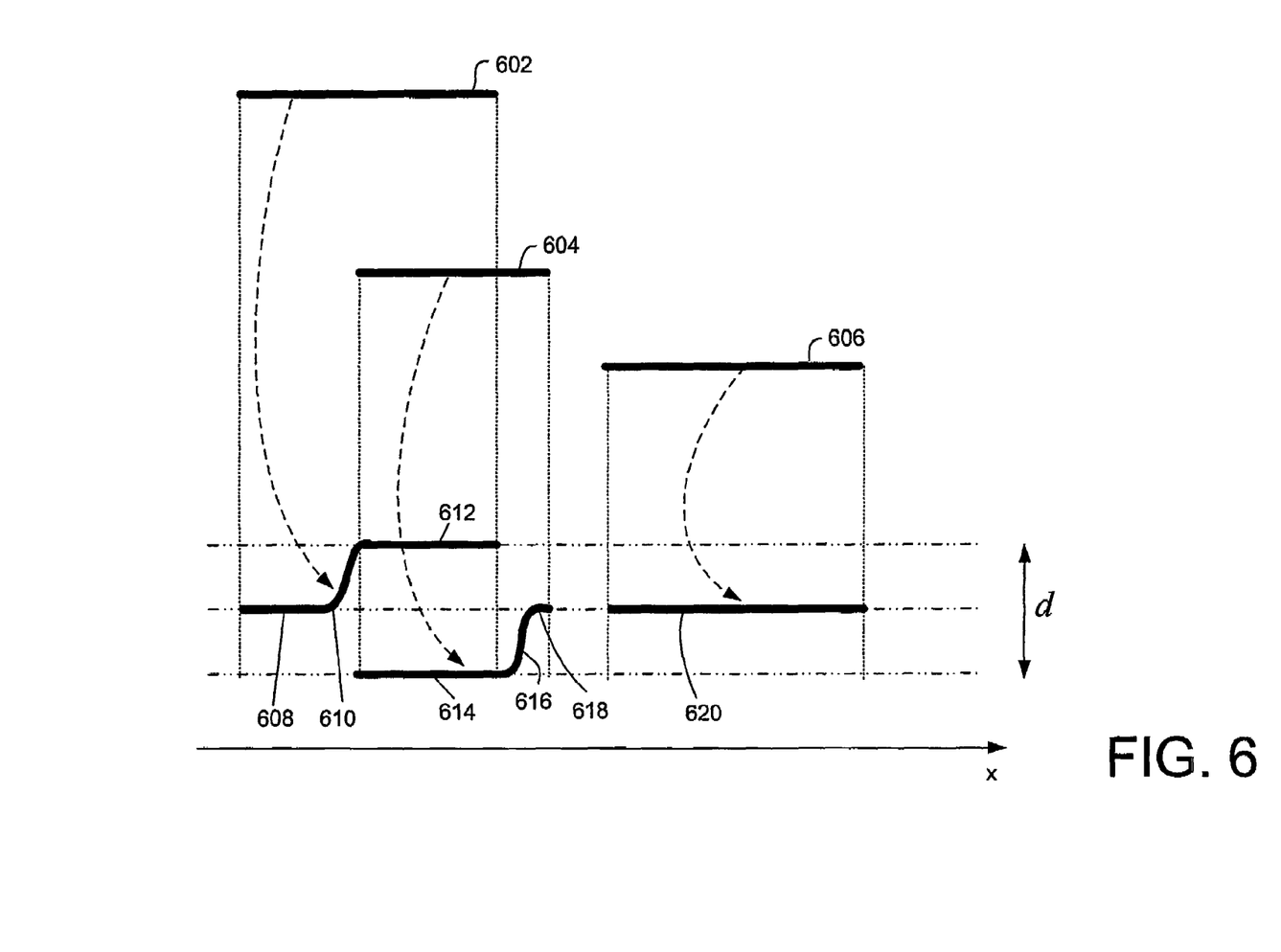
FIG. 6 schematically shows the scaling of a three-dimensional input model into a scaled three-dimensional output model.

FIG. 6 schematically shows the scaling of a three-dimensional input model into a scaled three-dimensional output model. The scaling is performed by means of the stretching approach as described in connection with FIG. 5. The three-dimensional input model comprises three objects 602-606 which are visible in a view which corresponds to a projection which is applicable for the display device. The display device has a depth range d. The stretching is such that the usage of the available depth-range is optimal. That means that if there are only two objects for a certain x,y pair then one of the objects, or a portion of it, is moved to the front border of the depth-range d and the other object, or a portion of it, is moved to the back border of the depth-range d. For example the first input object 602 partly overlaps with the second input object 604, i.e. the first input object 602 is partly occluded by the second input object 604. The result is that a first portion 612 corresponding to the first input object 602 is mapped to the back border of the depth range d and that a first portion 614 corresponding to the second input object 604 is mapped to the front border of the depth range d.

If there is only one object for a certain x,y pair then this object, or a portion of it, is moved to the center of the depth-range d. For example a first portion 620 corresponding to the third input object 606 is mapped to the center of the depth-range d. Also a second portion 618 corresponding to the second input object 604 is mapped to the front border of the depth-range d and a second portion 608 corresponding to the first input object 602 is mapped to the center of the depth-range d.

To make mappings from portions of one and the same input object smooth, there are transition portions. This smoothing is caused by the first filter unit 506 and the second filter unit 508. For example, a third portion 610 corresponding to the first input object 602 forms a transition from the center to the back border of the depth-range d, to connect the first portion 612 and the second portion, corresponding to the first input object 602. Also a third portion 616 corresponding to the second input object 604 forms a transition from the center to the front border of the depth-range d, to connect the first portion 614 and the second portion 618, corresponding to the first second object 604.

Figure 7:
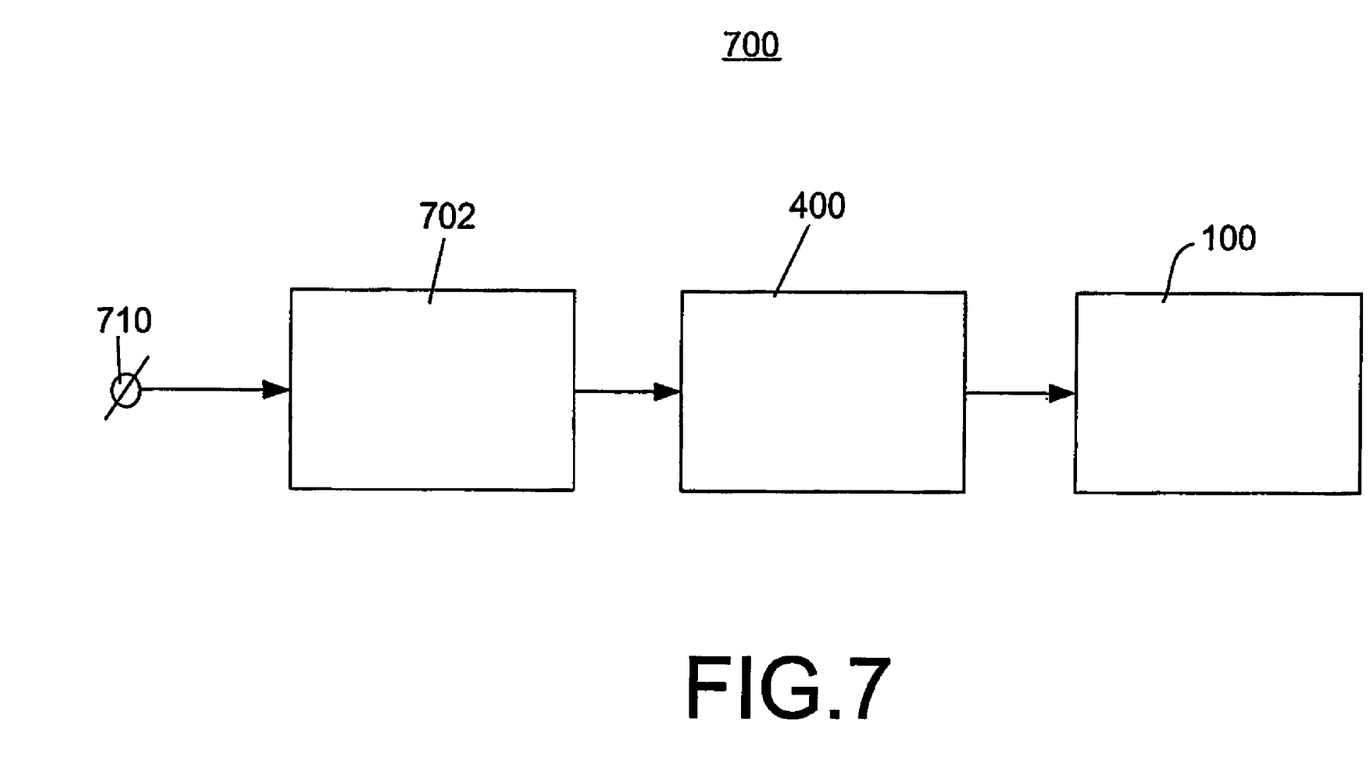
FIG. 7 schematically shows an image display apparatus according to the invention.

FIG. 7 schematically shows an image display apparatus 700 according to the invention, comprising:
- a receiver 702 for receiving a signal representing a three-dimensional input model;
- a scaling unit 400 for scaling the three-dimensional input model into a scaled three-dimensional output model, as described in connection with FIG. 4; and
- a display device 100 for visualizing a view of the scaled three-dimensional output model.

The signal may be a broadcast signal received via an antenna or cable but may also be a signal from a storage device like a VCR (Video Cassette Recorder) or Digital Versatile Disk (DVD). The signal is provided at the input connector 710. The image display apparatus 700 might e.g. be a TV. Optionally the image display apparatus 700 comprises storage means, like a hard-disk or means for storage on removable media, e.g. optical disks. The image display apparatus 700 might also be a system being applied by a film-studio or broadcaster.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. A method of scaling a three-dimensional input model (200-208) into a scaled three-dimensional output model (210-224), the method comprising:
   determining for portions of the three-dimensional input model (200-208) respective probabilities that the corresponding portions of the scaled three-dimensional output model (210-224) are visible in a two-dimensional view of the scaled three-dimensional output model, the determining (a) being based on a projection of multiple projections of the three-dimensional input model (200-208) in a viewing direction and (b) being based on a viewing angle and depth-range capability of a display device, further wherein determining respective probabilities that the corresponding portions are visible includes assigning to elements stored in a z-buffer stack a designation of (i) type I for a portion that definitely will be visible in one of the projections, (ii) type II for a portion that most probably will be visible in one of the projections, (iii) type III for a portion that most probably will not be visible in one of the projections, and (iv) type IV for a portion that definitely will not be visible in one of the projections; and
   geometrically transforming portions of the three-dimensional input model into the respective portions of the scaled three-dimensional output model on basis of the respective probabilities, wherein geometrically transforming of the portions comprise one of clipping, translation, rotation, or deformation, wherein no depth-range of the display device is wasted in the scaling for eventually invisible portions of the scaled three-dimensional output model.

2. A method of scaling a three-dimensional input model (200-208) as claimed in claim 1, whereby determining the probability that the first one of the portions is visible, is based on comparing a first value of a first coordinate of the first one of the portions with a second value of the first coordinate of a second one of the portions.

3. A method of scaling a three-dimensional input model (200-208) as claimed in claim 2, whereby determining the probability that a first one of the portions is visible, is based on capabilities of a display device (100) on which the three-dimensional scaled output model (210-224) will be displayed.

4. A method of scaling a three-dimensional input model (200-208) as claimed in claim 3, whereby the capabilities of the display device (100) correspond to a maximum viewing angle and a depth-range of the display device (100).

5. A method of scaling a three-dimensional input model (200-208) as claimed in claim 1, whereby the geometrically transforming the portions of the three-dimensional input model into the respective portions of the scaled three-dimensional output model on basis of the respective probabilities comprise one of translation, rotation or deformation.

6. A method of scaling a three-dimensional input model (1-8) as claimed in claim 1, comprising:
   computing the projection (302) of the three-dimensional input model (1-8) by means of a z-buffer stack (300);
   indicating which of the z-buffer stack elements are visible in the projection by means of comparing z-values of pairs of z-buffer stack elements having mutually equal x-values and mutually equal y-values;
   determining which groups of z-buffer stack elements form the respective portions of the three-dimensional input model (1-8), by means of segmentation of the z-buffer stack elements; and
   indicating the probability of visibility of each z-buffer stack element which is part of a group of z-buffer stack elements comprising a further z-buffer stack element which is visible.

7. A method of scaling a three-dimensional input model (200-208) as claimed in claim 6, further comprising
   determining for each array of z-buffer stack elements having mutually equal x-values and mutually equal y-values a corresponding minimum z-value and maximum z-value; and
   computing scaled z-values for the z-buffer stack elements on basis of the respective minimum z-values and maximum z-values and the depth-range of the display device (100).

8. A method of scaling a three-dimensional input model (200-208) as claimed in claim 7, whereby determining minimum z-values is based on a morphologic operation.

9. A scaling unit (400) for scaling a three-dimensional input model (200-208) into a three-dimensional scaled output model (210-224), the scaling unit (400) comprising:
   probability determining means (402) for determining for portions of the three-dimensional input model (200-208) respective probabilities that the corresponding portions of the scaled three-dimensional output model (210-224) are visible in a two-dimensional view of the scaled three-dimensional output model, the determining (a) being based on a projection of multiple projections of the three-dimensional input model (200-208) in a viewing direction and (b) being based on a viewing angle and depth-range capability of a display device, further wherein determining respective probabilities that the corresponding portions are visible includes assigning to elements stored in a z-buffer stack a designation of (i) type I for a portion that definitely will be visible in one of the projections, (ii) type II for a portion that most probably will be visible in one of the projections, (iii) type III for a portion that most probably will not be visible in one of the projections, and (iv) type IV for a portion that definitely will not be visible in one of the projections; and transforming means (408) for geometrically transforming portions of the three-diminsional input model into the respective portions of the scaled three-dimensional output model on basis of the respective probabilities, wherein geometrically transforming of the portions comprise one of clipping, translation, rotation, or deformation, wherein no dedth-range of the display device is wasted in the scaling for eventually invisible portions of the scaled three-dimensional output model.

10. An image display apparatus (700) comprising:

receiving means (702) for receiving a signal representing a three-dimensional input model (200-208);

a scaling unit (400) for scaling the three-dimensional input model (200-208) into a scaled three-dimensional output model (210-224), as claimed in claim 9; and display means (100) for visualizing a view of the scaled three-dimensional output model (210-224).

* * * * *